United States Patent
Taguchi et al.

(10) Patent No.: US 7,112,647 B2
(45) Date of Patent: Sep. 26, 2006

(54) FLUORINATED POLYMER

(75) Inventors: Isamu Taguchi, Ichihara (JP); Ryuji Monden, Yachiyo (JP); Nobutoshi Sasaki, Kawasaki (JP); Hideo Miyata, Yokohama (JP); Kohei Morikawa, Tokyo (JP)

(73) Assignee: Showa Denko K.K., Tokyo (JP)

( * ) Notice: Subject to any disclaimer, the term of this patent is extended or adjusted under 35 U.S.C. 154(b) by 113 days.

(21) Appl. No.: 10/499,945

(22) PCT Filed: Dec. 25, 2002

(86) PCT No.: PCT/JP02/13499
§ 371 (c)(1),
(2), (4) Date: Jun. 23, 2004

(87) PCT Pub. No.: WO03/055936
PCT Pub. Date: Jul. 10, 2003

(65) Prior Publication Data
US 2005/0080230 A1    Apr. 14, 2005

(30) Foreign Application Priority Data
Dec. 26, 2001 (JP) ............... 2001-393395
Sep. 18, 2002 (JP) ............... 2002-270840

(51) Int. Cl.
*C08G 69/26* (2006.01)
(52) U.S. Cl. ............... 528/347; 528/310; 528/272; 528/196; 528/70; 528/84; 528/322; 528/340; 528/348; 522/1
(58) Field of Classification Search ............... 528/347, 528/70, 84, 340, 348, 310, 322; 522/1
See application file for complete search history.

(56) References Cited

U.S. PATENT DOCUMENTS 4,734,486 A    3/1988    Bristowe

FOREIGN PATENT DOCUMENTS

| GB | 2 127 013 A | 4/1984 |
|----|-------------|--------|
| JP | 63 172 728  | 7/1988 |
| JP | 10-81738    | 3/1998 |
| JP | 2000-292635 | 10/2000 |

*Primary Examiner*—P. Hampton Hightower
(74) *Attorney, Agent, or Firm*—Sughrue Mion, PLLC.

(57) ABSTRACT

An object of the present invention is to provide a fluorinated polymer of adequate molecular weight with excellent transparency in a wavelength range from visible to near infrared, and to also provide a method of producing such a polymer. The present invention provides a fluorinated polymer comprising a structure represented by a formula (1) as a structural unit,

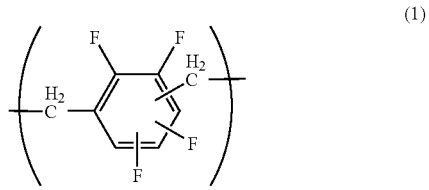

(1)

as well as a method of producing this polymer using a corresponding tetrafluoroxylylenediamine or a tetrafluoroxylylene glycol as a raw material.

25 Claims, 1 Drawing Sheet

FIG. 1

FLUORINATED POLYMER

This is a National Phase entry of Application No. PCT/JP02/13499 filed Dec. 25, 2002; the disclosure of which is incorporated herein by reference.

TECHNICAL FIELD

The present invention relates to a fluorinated polymer.

More particularly, the present invention relates to a fluorinated polymer with good heat resistance, excellent water repellency, excellent optical characteristics, and particularly superior transparency in a wavelength range from visible to near infrared.

BACKGROUND ART

Fluorinated polymers are known to have properties of water repellency, oil repellency and dirt prevention due to the presence of fluorine atoms. Furthermore, because fluorinated polymers display excellent transparency in a wavelength range from visible to near infrared, in recent years, with the development of optical communication systems, such fluorinated polymers have been investigated for potential use as the materials for a variety of optical communication components and optical devices. For example, an aromatic polyester with tetrafluorophthalic acid as a structural unit is disclosed in patent reference 1, and a fluorinated aromatic polyester carbonate resin is disclosed in patent reference 2. Furthermore, patent reference 3 discloses the use of a fluorinated polyimide resin as an optical waveguide.

Fluorinated polymers are produced by a condensation or an addition reaction of a nucleophile such as a diamine compound or a diol and a nucleophile target compound such as a carboxylic acid or an isocyanate, wherein at least one of the reactants is a fluorinated compound.

However, when an attempt is made to introduce fluorine using a fluorinated aromatic diamine or a fluorinated aromatic diol as the fluorinated compound, then in those cases where the amino group or the hydroxyl group is bonded directly to the aromatic ring, the nucleophilic reactivity of the nitrogen atom or the oxygen atom of the fluorinated aromatic diamine or the fluorinated aromatic diol decreases markedly due to the high electronegativity and high electron-withdrawing property of the fluorine atom. As a result, the reaction requires high temperatures and prolonged heating, and consequently problems such as coloring arise, and the molecular weight of the polymer does not increase sufficiently.

1. Japanese Unexamined Patent Application, First Publication No. Sho 63-172728
2. Japanese Unexamined Patent Application, First Publication No. Hei 10-081738
3. Japanese Unexamined Patent Application, First Publication No. 2000-292635

An object of the present invention is to provide a fluorinated polymer of adequate molecular weight with excellent transparency in a wavelength range from visible to near infrared. Furthermore, another object of the present invention is to provide a method of producing such a polymer.

DISCLOSURE OF INVENTION

As a result of intensive investigations, the inventors of the present invention discovered that by using a tetrafluoroxylylenediamine or a tetrafluoroxylylene glycol represented by a formula (10) shown below as the raw material fluorinated aromatic diamine or the raw material fluorinated aromatic diol in a fluorinated aromatic polymer, (wherein, X represents an amino group or a hydroxyl group), a product with good reactivity and excellent transparency within the near infrared region can be produced, and were hence able to complete the present invention.

By converting the amino groups or the hydroxyl groups of these tetrafluoroxylylenediamines or tetrafluoroxylylene glycols to isocyanate groups or chlorocarbonyloxy groups (chloroformate derivatives) using phosgene (carbonyl dichloride) or the like, a wider variety of fluorinated polymers can also be produced.

More specifically, the present invention incorporates the following aspects.

[1] A fluorinated polymer comprising a structure represented by a formula (1) as a structural unit.

[2] A fluorinated polymer according to [1] above, comprising at least one of an imide structure, an amide structure, an ester structure, a carbonate structure, a urea structure and a urethane structure as a structural unit.

[3] A fluorinated polymer according to either one of [1] and [2] above, wherein a repeating unit comprising a structural unit with a structure represented by the formula (1) accounts for at least 10 mol % of all the repeating units within the polymer.

[4] A fluorinated polymer according to any one of [1] through [3] above, comprising at least one of the structures represented by formula (2), formula (3), formula (4), formula (5), formula (6), formula (7), formula (8) and formula (9) as a structural unit.

(wherein, R represents a hydrogen atom or a low alkyl group of 1 to 4 carbon atoms).

[5] A fluorinated polymer according to any one of [1] through [3] above, obtained by reacting a compound represented by a formula (10) shown below, (wherein X represents an amino group) with a tetracarboxylic acid compound or a derivative thereof, or with a tricarboxylic acid compound or a derivative thereof.

[6] A fluorinated polymer according to any one of [1] through [3] above, obtained by reacting a compound represented by the formula (10) (wherein X represents an amino group) with a dicarboxylic acid compound or a derivative thereof.

[7] A fluorinated polymer according to any one of [1] through [3] above, obtained by reacting a compound represented by the formula (10) (wherein X represents an amino group) with a diisocyanate compound or a dicarbamyl chloride compound.

[8] A fluorinated polymer according to any one of [1] through [3] above, obtained by reacting a compound represented by the formula (10) (wherein X represents an amino group) with a di(chlorocarbonyloxy) compound.

[9] A fluorinated polymer according to any one of [1] through [3] above, obtained by reacting a compound represented by the formula (10) (wherein X represents an isocyanate group) with a diamine compound.

[10] A fluorinated polymer according to any one of [1] through [3] above, obtained by reacting a compound represented by the formula (10) (wherein X represents an isocyanate group) with a diol compound.

[11] A fluorinated polymer according to any one of [1] through [3] above, obtained by reacting a compound represented by the formula (10) (wherein X represents a hydroxyl group) with a dicarboxylic acid compound or a derivative thereof.

[12] A fluorinated polymer according to any one of [1] through [3] above, obtained by reacting a compound represented by the formula (10) (wherein X represents a hydroxyl group) with a diisocyanate compound or a dicarbamyl chloride compound.

[13] A fluorinated polymer according to any one of [1] through [3] above, obtained by reacting a compound represented by the formula (10) (wherein X represents a hydroxyl group) with a di(chlorocarbonyloxy) compound.

[14] A fluorinated polymer according to any one of [1] through [3] above, obtained by reacting a compound represented by the formula (10) (wherein X represents a chlorocarbonyloxy group) with a diamine compound.

[15] A fluorinated polymer according to any one of [1] through [3] above, obtained by reacting a compound represented by the formula (10) (wherein X represents a chlorocarbonyloxy group) with a diol compound.

[16] A fluorinated polymer according to [1] above, comprising a structure represented by a formula (11) as a structural unit:

(wherein Q represents a tetravalent organic group).

[17] A fluorinated polymer according to any one of [1] through [3] above, comprising a structure represented by a formula (12) as a structural unit.

[18] A method of producing a fluorinated polymer, wherein a compound represented by the formula (10) (wherein X represents an amino group) and a tetracarboxylic acid compound or a derivative thereof, or a tricarboxylic acid compound or a derivative thereof, are reacted together to produce a fluorinated polymer according to any one of [1] through [3], and [5] above.

[19] A method of producing a fluorinated polymer, wherein a compound represented by the formula (10) (wherein X represents an amino group) and a dicarboxylic acid compound or a derivative thereof are reacted together to produce a fluorinated polymer according to any one of [1] through [3], and [6] above.

[20] A method of producing a fluorinated polymer, wherein a compound represented by the formula (10) (wherein X represents an amino group) and a diisocyanate compound or a dicarbamoyl chloride compound are reacted together to produce a fluorinated polymer according to any one of [1] through [3], and [7] above.

[21] A method of producing a fluorinated polymer, wherein a compound represented by the formula (10) (wherein X represents an amino group) and a di(chloroformate) compound are reacted together to produce a fluorinated polymer according to any one of [1] through [3], and [8] above.

[22] A method of producing a fluorinated polymer, wherein a compound represented by the formula (10) (wherein X represents an isocyanate group) and a diamine compound are reacted together to produce a fluorinated polymer according to any one of [1] through [3], and [9] above.

[23] A method of producing a fluorinated polymer, wherein a compound represented by the formula (10) (wherein X represents an isocyanate group) and a diol compound are reacted together to produce a fluorinated polymer according to any one of [1] through [3], and [10] above.

[24] A method of producing a fluorinated polymer, wherein a compound represented by the formula (10) (wherein X represents a hydroxyl group) and a dicarboxylic acid compound or a derivative thereof are reacted together to produce a fluorinated polymer according to any one of [1] through [3], and [11] above.

[25] A method of producing a fluorinated polymer, wherein a compound represented by the formula (10) (wherein X represents a hydroxyl group) and a diisocyanate compound or a dicarbamoyl chloride compound are reacted together to produce a fluorinated polymer according to any one of [1] through [3], and [12] above.

[26] A method of producing a fluorinated polymer, wherein a compound represented by the formula (10) (wherein X represents a hydroxyl group) and a di(chlorocarbonyloxy) compound are reacted together to produce a fluorinated polymer according to any one of [1] through [3], and [13] above.

[27] A method of producing a fluorinated polymer, wherein a compound represented by the formula (10) (wherein X represents a chlorocarbonyloxy group) and a diamine compound are reacted together to produce a fluorinated polymer according to any one of [1] through [3], and [14] above.

[28] A method of producing a fluorinated polymer, wherein a compound represented by the formula (10) (wherein X represents a chlorocarbonyloxy group) and a diol compound are reacted together to produce a fluorinated polymer according to any one of [1] through [3], and [15] above.

BEST MODE FOR CARRYING OUT THE INVENTION

The present invention is a polymer comprising a structural unit represented by a formula (1), in which the organic groups of the other structural units are bonded via any one of an imide structure, an amide structure, an ester structure, a carbonate structure, a urea structure and a urethane structure. Optically, this polymer displays little absorption in the long wavelength region of a visible ray. Furthermore, because the polymerization reactivity of raw material monomers such as those represented by the formula (10) is good, high molecular weight polymers can be produced relatively easily, and are industrially useful.

In a polymer of the present invention, the quantity of the repeating unit comprising the structural unit represented by the formula (1) should be sufficient to produce the desired properties, and should preferably account for at least 10 mol %, and even more preferably at least 20 mol %, and most preferably at least 25 mol %, of all the repeating units within the polymer. If the number of these required repeating units is too small, then the absorption in the long wavelength region of a visible ray may not decrease to a sufficient degree.

In other words, in the case of a copolymerization of a compound represented by a formula (10), (10)

wherein X represents an amino group, namely a tetrafluoroxylylenediamine, with a dicarboxylic acid compound in a molar ratio of 1:1, the percentage of repeating units comprising the structural unit of the formula (1) is 50 mol %.

If a compound of the formula (10) in which the group X is a hydroxyl group, namely a tetrafluoroxylylene glycol is used as the only monomer, and reacted with phosgene, then the percentage of repeating units comprising the structural unit of the formula (1) is 100 mol %. In this case, if a desired quantity of another diol compound is also used, then the percentage of repeating units comprising the structural unit of the formula (1) can be adjusted to any desired level.

Of the compounds represented by the formula (10), which represent raw materials for fluorinated polymers of the present invention, (10)

tetrafluoroxylylenediamine compounds, in which the group X represents an amino group, can be prepared by the method disclosed in Japanese Examined Patent Application, Second Publication No. Hei 4-14096, by reducing tetrafluoroterephthalonitrile, tetrafluoroisophthalonitrile or tetrafluorophthalonitrile with hydrogen.

Tetrafluoroxylylene glycol compounds, in which the group X represents a hydroxyl group, can be prepared by reducing the corresponding tetrafluoroterephthalic acid, tetrafluoroisophthalic acid or tetrafluorophthalic acid using standard methods, or may also be produced by diazo decomposition of a tetrafluoroxylylenediamine obtained in the manner described above using sodium nitrite (Japanese Examined Patent Application, Second Publication No. Sho 61-1056).

In addition, these tetrafluoroxylylenediamine compounds and tetrafluorobenzenedimethanol compounds can also be converted to tetrafluoroxylylene diiusocyanate compounds (formula (10) in which the group X represents an isocyanate group) or tetrafluorobis(chlorocarbonyloxymethyl)benzene compounds (formula (10) in which the group X represents a chlorocarbonyloxy group) by reaction with a carbonyl dihalide such as phosgene or a homologue of phosgene such as phosgene dimer, under standard conditions.

In the present invention, by reacting and polymerizing a compound represented by the formula (10) (wherein X represents an amino group, a hydroxyl group, an isocyanate group or a chlorocarbonyloxy group) with a compound containing at least two functional groups capable of reacting with the X groups, using standard methods, a fluorinated polymer can be produced with the structures of formula (2) through formula (9) or formula (11) as partial structures. This polymer comprises a basic structure represented by the formula (10) with no C—H bonds within the benzene ring, and consequently a polymer with excellent optical property can be designed.

As follows is a more detailed description of a method of producing a fluorinated polymer comprising the structures of formula (2) through formula (9) or formula (11) of the present invention as partial structures.

The polyimide type structures of the structural units represented by the formula (2) and the formula (11) can be produced using typical reaction methods used for producing polyimides. For example, first, a tetrafluoroxylylenediamine can be reacted with a tetracarboxylic acid or a derivative thereof to obtain a polyamic acid. In this reaction, the polyamic acid is preferably obtained by reaction in a solvent, using a tetracarboxylic anhydride. Following isolation of the polyamic acid, a polyimide type polymer can be obtained by imidization, using either a thermal imidization method by heating at a temperature of at least 300° C., or a chemical imidization method using a cyclodehydration agent produced from a solution of acetic anhydride and a tertiary amine.

The reaction solvent for producing the polyamic acid should preferably be amide solvents, specifically dimethylformamide, dimethylacetamide or N-methylpyrrolidone. The tertiary amine for the imidization cyclodehydration should preferably be pyridine.

The reaction temperature for production of the polyamic acid will vary depending on the variety of tetracarboxylic acid used, although temperatures within a range from −20° C. through to the boiling point of the solvent are preferred. The temperature for a thermal imidization is within a range from 300° C. to 500° C. The reaction temperature for a chemical imidization should preferably be a temperature within a range from room temperature through to the boiling point of the solvent.

There are no particular restrictions on the tetracarboxylic anhydride, and examples of well known materials include pyromellitic anhydride, biphenyl-3,4,3',4'-tetracarboxylic anhydride, oxydiphthalic anhydride, benzophenone-3,4,3',4'-tetracarboxylic anhydride, diphenylsulfone-3,4,3',4'-tetracarboxylic anhydride, isopropylidenediphthalic anhydride and hexafluoroisopropylidenediphthalic anhydride.

The group Q representing the tetravalent organic group in the formula (11) refers to an organic structure capable of forming an aforementioned tetracarboxylic acid residue or two imide structures.

The polyamide type structure of the structural unit represented by the formula (4) can be produced by a condensation reaction of a tetrafluoroxylylenediamine with a dicarboxylic acid or a derivative thereof. Any of a variety of known methods can be used to effect the condensation reaction. Examples of suitable methods include a melt polycondensation method in which a polyamide salt is formed from the dicarboxylic acid and the tetrafluoroxylylenediamine, and this salt is then subjected to a dehydration under heating at a high temperature to generate a polyamide, a method in which the dicarboxylic acid and the tetrafluoroxylylenediamine are reacted together in the presence of a condensing agent to form a polyamide, and a method in which the tetrafluoroxylylenediamine is reacted with a dicarboxylic acid in the form of an acid chloride or an activated ester, and interfacial polycondensation methods and solution polycondensation methods can also be used.

In those methods using a condensing agent, reaction can be performed at temperatures ranging from room temperature through to the boiling point of the solvent, whereas in methods using an acid chloride or an activated ester, reaction can be performed at temperatures ranging from −20° C. through to the boiling point of the solvent. There are no particular restrictions on the condensing agent, and triphenylphosphite-pyridine is a suitable example.

There are no particular restrictions on the dicarboxylic acid or derivative thereof which is used, and examples of typically used materials include aliphatic dicarboxylic acids such as succinic acid, glutaric acid and adipic acid; fluorinated aliphatic dicarboxylic acids such as tetrafluorosuccinic acid, hexafluoroglutaric acid and octafluoroadipic acid; aliphatic cyclic dicarboxylic acids such as hexanedicarboxylic-acid; aromatic dicarboxylic acids such as terephthalic acid, isophthalic acid, oxydibenzoic acid and isopropylidenedibenzoic acid; and fluorinated aromatic dicarboxylic acids such as tetrafluoroterephthalic acid, tetrafluoroisophthalic acid and hexafluoropropylidenedibenzoic acid.

The polyimide-amide type structure of the structural unit represented by the formula (3) can be produced by the reaction of a tetrafluoroxylylenediamine with trimellitic anhydride, for example. The reaction conditions can be a combination of the conditions described above for producing an amide type polymer and an imide type polymer.

The polyurethane type structure of the structural unit represented by the formula (5) can be produced by reaction of a tetrafluoroxylylenediamine and a bis(chlorocarbonyloxy) compound, under typical conditions used for the reaction of an amine and a chlorocarbonate ester derivative.

The bis(chlorocarbonyloxy) compound can be produced under standard conditions, using any of a variety of diol compounds and a carbonyl halide such as phosgene. There are no particular restrictions on the diol compound, and examples of typically used compounds include ethylene glycol, propylene glycol, polyethylene glycol, polypropylene glycol, o-cresol, m-cresol, p-cresol, and tetrafluoroxylylene glycol compounds represented by the formula (10) in which the group X is a hydroxyl group.

Furthermore, the polyurethane type structure of the structural unit represented by the formula (5) can also be produced by reacting a tetrafluoroxylylene diisocyanate compound, represented by the formula (10) in which the group X is an isocyanate group, with the type of diol described above.

The urea type structure of the structural unit represented by the formula (6) can be produced by reacting a tetrafluoroxylylenediamine with a diiosocyanate compound.

There are no particular restrictions on the diisocyanate compound, and examples of typically-used compounds include hexamethylene diisocyanate, 2,4-tolylene diisocyanate, methylenebisphenylisocyanate, xylylene diisocyanate, and tetrafluoroxylylene diisocyanate compounds represented by the formula (10) in which the group X is an isocyanate group. The reaction conditions may utilize typical conditions used for the reaction of an amine and an isocyanate.

The polyurea type structure represented by the formula (6) can be produced by reacting a tetrafluoroxylylene diisocyanate compound, represented by the formula (10) in which the group X is an isocyanate group, with a diamine compound.

There are no particular restrictions on the diamine compound, and examples of typically used compounds include ethylenediamine, phenylenediamine, xylylenediamine, and tetrafluoroxylylenediamine compounds represented by the formula (10) in which the group X is an amine group.

The R group in the formula (6) and the formula (9) represents either a hydrogen atom or an alkyl group of 1 to 4 carbon atoms. Of these groups, hydrogen atoms, methyl groups or ethyl groups are preferred.

The polyester type structure represented by the formula (7) can be synthesized by reacting and polymerizing a tetrafluoroxylylene glycol with a dicarboxylic acid under typical reaction conditions. Examples of suitable methods include direct esterification methods in which the tetrafluoroxylylene glycol and the dicarboxylic acid are polymerized directly, acid chloride methods in which the dicarboxylic acid is converted to an activated acid chloride prior to reaction, methods in which the dicarboxylic acid is polymerized within a polymerization system using an activator, and methods in which polymerization is conducted via transesterification using an ester derivative of the dicarboxylic acid.

In direct esterification methods, reaction is conducted at 180 to 230° C. under conditions of reduced pressure, with a protic acid or a Lewis acid being added as a catalyst where necessary. In acid chloride methods, the polymer can be obtained by reaction in a solvent, in the presence of a tertiary amine, and at a temperature close to room temperature. Examples of the activator used in those methods utilizing such an activator include arylsulfonyl chloride-DMF, thionyl chloride-pyridine, and triphenylphosphine dichloride. The polymer can be obtained by mixing the activator and the dicarboxylic acid, adding a tetrafluoroxylylene glycol represented by the formula (10) in which the group X is a hydroxyl group, and then heating at a temperature of approximately 100° C.

Examples of suitable dicarboxylic acids for producing a polyester type structure include the same compounds detailed above in relation to the synthesis of polyamides.

The polycarbonate type structure represented by the formula (8) can be produced by dissolving a tetrafluoroxylylene glycol in a solvent, and then blowing phosgene through the solution in the presence of a tertiary amine such as pyridine, yielding a fluorinated polymer in which the tetrafluoroxylylene glycol is linked via carbonyl groups.

Copolymers can also be produced by using another diol compound (such as bisphenol-A or hexafluoroisopropylidenediphenol) in addition to the tetrafluoroxylylene glycol. In such a case, a fluorinated polymer is produced in which the tetrafluoroxylylene glycol units and the units of the other diol compound are linked randomly via carbonyl linkages. However, by first reacting the tetrafluoroxylylene glycol or the other diol with phosgene to form a bis(chlorocarbonyloxy) compound, prior to performing the main reaction, the copolymerization pattern can be controlled to-produce a non-random, desired pattern of repeating units.

The polyurethane type structure represented by the formula (9) can be obtained by reacting a tetrafluoroxylylene glycol, represented by the formula (10) in which the group X is a hydroxyl group, with a diisocyanate. Examples of suitable diisocyanate compounds include the same compounds detailed above in relation to the production of polyurea type polymers.

The polyurethane type structure represented by the formula (9) can also be obtained by reacting a tetrafluoroxylylene glycol with phosgene to form a bis(chlorocarbonyloxy) compound (a compound of the formula (10) in which the group X is a chlorocarbonyloxy group), and then performing a subsequent reaction with a diamine compound.

Examples of methods of producing each of the structural units of fluorinated polymers of the present invention, with structural units represented by the formulas (2) through (9) and the formula (11), are presented above, although the present invention is not restricted solely to polymers with a single repeating unit, and copolymers with any of the structural units represented by the formulas (2) through (9) and the formula (11) in an arbitrary repeating pattern are also possible. In other words, a desired. copolymer can be produced by copolymerization, either within a system containing different compounds of the formula (10) in which the group X is an amine group (a tetrafluoroxylylenediamine) or a hydroxyl group (a tetrafluoroxylylene glycol), or by alternate addition of these compounds. Furthermore, by using a plurality of compounds of the formula (10) in which the group X is an isocyanate group or a chlorocarbonyloxy group, a polymer with certain desired copolymerization units can be designed and produced.

In addition, provided a structural unit represented by the formulas (2) through (9) or the formula (11) of the present invention is present within the polymer, then a copolymer with a desired level of fluorine incorporation can be designed and produced using a plurality of three or more different monomers. By altering the fluorine content of a fluorinated polymer of the present invention, characteristics such as the refractive index can be altered and controlled.

Fluorinated polymers of the present invention can be used as transparent resins, typically as optical materials, within fields such as liquid crystal displays (as plastic substrates for light guides, prism sheets, polarizing plates, phase difference plates and viewable angle compensation films and the like), next generation flat panel displays (color PDP, LED, FDP and organic EL and the like), optical recording (video disks, CD/CD-ROM, CD-R/RW, DVD, DVD-R/Rewritable, MO/MD, PD and optical cards and the like), optical equipment (such as still cameras, video cameras, projections televisions, and light sensing equipment and the like)., optical components (such as optical switches, optical connectors, photoreceptor components and optical circuit components), optical fibers, automobiles, railway carriages, aircraft, and, architecture (for housing or gardening facilities). In terms of specific examples for each of the different resins, a representative use for the polycarbonate resins is as an optical disk substrate material. Representative uses of the polyimide resins are typically within the field of electronics, including utilization as optical and electronics materials such as insulating materials, coating materials, optical fibers and optical waveguides. Representative uses of the polyester resins include utilization as vehicle oil tanks, and materials for electronic and electrical components.

EXAMPLES

As follows is a more detailed description of fluorinated polymers of the present invention and starting materials therefor, based on a series of examples, although the present invention is in no way restricted to the examples presented here.

Example 1

Polyimide Type Polymer 1.04 g (5 mmol) of tetrafluoro-p-xylylenediamine was dissolved in 15 ml of N,N-dimethylacetamide. 2.23 g (5 mmol) of 4,4'-(hexafluoroisopropylidene)diphthalic anhydride was then added gradually, under an atmosphere of nitrogen and at a temperature of 15° C. The resulting mixture was stirred for 6 hours at room temperature and yielded a polyamic acid.

The intrinsic viscosity of the N,N-dimethylacetamide solution of this polyamic acid was 1.85 dl/g (30° C.) (the molecular weight equivalent was 100,000).

Figure 1:
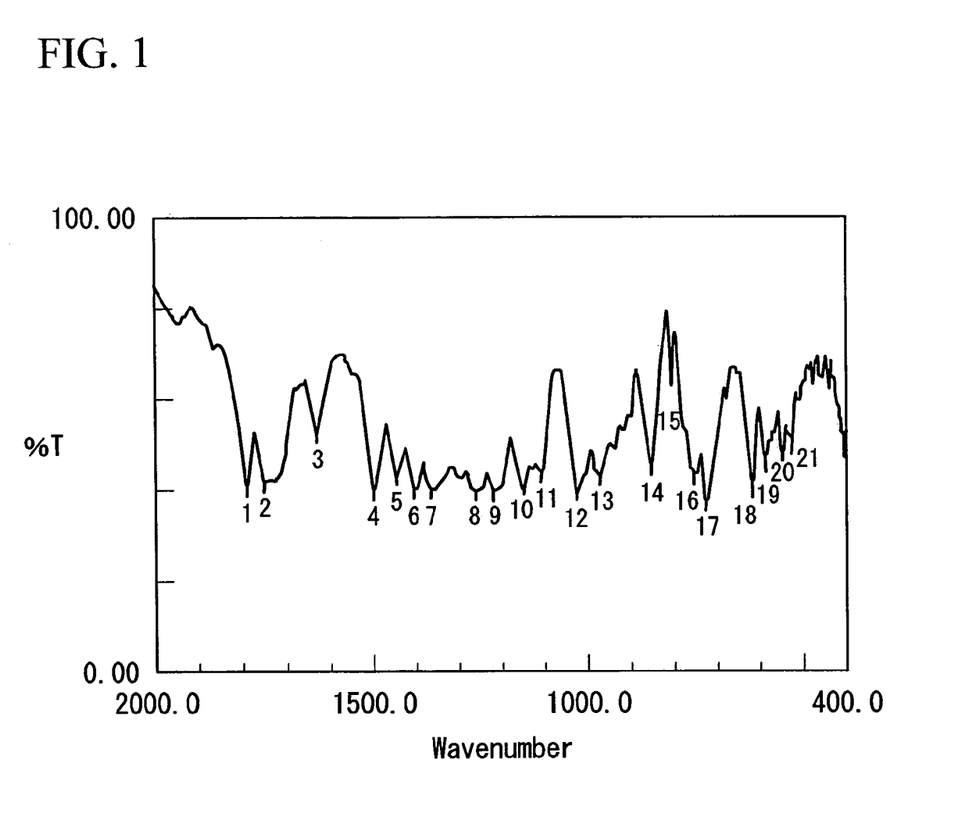
FIG. 1 is an infrared absorption spectrum of a polyimide compound produced in an example 1.

The polyamic acid was cast onto a glass plate, dried overnight at 80° C. using circulation drying, and then subjected to imidization under an atmosphere of nitrogen by heating for 1 hour at 100° C., 2 hours at 200° C., and then 1 hour at 300° C. A transparent polyimide film was obtained. The infrared absorption spectrum of the film is shown in FIG. 1.

Comparative Example 1

Instead of the tetrafluoro-p-xylylenediamine, 0.90 g (5 mmol) of tetrafluoro-p-phenylenediamine in which the amino groups are bonded directly to the benzene ring was dissolved in 15 ml of N,N-dimethylacetamide. 2.23 g (5 mmol) of 4,4'-(hexafluoroisopropylidene)diphthalic anhydride was then added gradually, under an atmosphere of nitrogen and at a temperature of 15° C. The resulting mixture was stirred for 6 hours at room temperature and yielded a polyamic acid.

The intrinsic viscosity of the N,N-dimethylacetamide solution of this polyamic acid was 0.21 dl/g, significantly lower than that of the example 1 (the molecular weight equivalent was 6200). Imidization was conducted in a similar manner to the example 1 and yielded a transparent polyimide film.

Comparative Example 2

Instead of the tetrafluoro-p-xylylenediamine, 0.90 g (5 mmol) of p-phenylenediamine, with no fluorine atoms on the benzene ring, was dissolved in 15 ml of N,N-dimethylacetamide. 2.23 g (5 mmol) of 4,4'-(hexafluoroisopropylidene)diphthalic anhydride was then added gradually, under an atmosphere of nitrogen and at a temperature of 15° C. The resulting mixture was stirred for 6 hours at room temperature and yielded a polyamic acid.

Imidization was conducted in a similar manner to the example 1, and yielded a reddish brown colored polyimide film.

Example 2

Polyamide Synthesis 1.042 g (5 mmol) of tetrafluoro-p-xylylenediamine was dissolved in 15 ml of N,N-dimethylacetamide, 1.96 g (5 mmol) of 4,4'-(hexafluoroisopropylidene)dibenzoic acid was added, and the mixture was stirred for 1 hour at room temperature. The product polyamide salt was filtered and washed with ethanol.

This polyamide salt was placed in a test tube equipped with a nitrogen inlet and a reduced pressure cock, and was then heated to 300° C. under a stream of nitrogen and melted. Next, the system pressure was reduced to approximately 10 torr, and the reaction was allowed to proceed for one hour, before the pressure was returned to normal under a stream of nitrogen and the temperature was cooled to room temperature. The intrinsic viscosity of the thus obtained polyamide was 1.12 dl/g (solvent: N,N-dimethylacetamide/ 30° C.).

Comparative Example 3

Instead of the tetrafluoro-p-xylylenediamine, 1.64 g (5 mmol) of octafluoro-4,4'-benzidine was dissolved in 15 ml of N,N-dimethylacetamide, and 1.96 g (5 mmol) of 4,4'-(hexafluoroisopropylidene)dibenzoic acid was then added and stirred. However, a polyamide salt was not formed.

Example 3

Polyester Synthesis 1.05 g (5 mmol) of tetrafluoro-p-xylylene glycol was added to 25 ml of dicholoromethane and stirred to form a suspension. With the reaction vessel cooled in an ice bath, 1.06 g (10.5 mmol) of distillation purified triethylamine was then added and stirred. A solution of 2.15 g of 4,4'-(hexafluoroisopropylidene)dibenzoyl chloride in 25 ml of dichloromethane was then added dropwise to the reaction mixture. Following completion of the addition, the polymerization mixture was stirred for a further 1 hour at room temperature. A further 50 ml of dichloromethane was then added to dilute the reaction mixture. This mixture was poured into 250 ml of hexane, and the polymer was precipitated. The polymer was filtered off, placed in a mixer with water, and mixed to remove the triethylamine hydrochloride. The polymer obtained by subsequent drying displayed an intrinsic viscosity of 0.95 dl/g (solvent: sym-tetrachloroethanol/phenol=40/60, 30° C.).

Comparative Example 4

1.14 g (5 mmol) of bisphenol-A was added to 25 ml of dicholoromethane and stirred. With the reaction vessel cooled in an ice bath, 1.06 g (10.5 mmol) of distillation purified triethylamine was then added and stirred. A solution comprising a mixture of 0.507 g (2.5 mmol) of terephthaloyl chloride and 0.507 g (5 mmol) of isophthaloyl chloride in 25 ml of dichloromethane was then added dropwise to the reaction mixture. Subsequent reaction was conducted in a similar manner to the example 3, and yielded a polyester.

The intrinsic viscosity of the polymer was 2.1 dl/g (solvent: sym-tetrachloroethanol/phenol=40/60, 30° C.).

Example 4

Polycarbonate Synthesis 0.42 g (2 mmol) of tetrafluoro-p-xylylene glycol and 1.01 g (3 mmol) of 4,4'-(hexafluoroisopropylidene)diphenol was dissolved in 20 ml of pyridine, and with the temperature maintained at approximately room temperature, 0.544 g (5.5 mmol) of phosgene was blown gradually through the reaction system with vigorous stirring. Following completion of the phosgene addition, the mixture was stirred for a further 30 minutes, and 20 ml of methanol was then added to precipitate the polymer.

The polymer was removed by filtration, and in order to remove the pyridine, the polymer was suspended in methanol, stirred in a mixer, and then once again filtered off. This process was repeated three times. The intrinsic viscosity of the copolymer obtained by subsequent vacuum drying was 0.36 dl/g (solvent: dichloromethane, 25° C.).

Example 5

Polyurethane Synthesis 1.05 g (5 mmol) of tetrafluoro-p-xylylene glycol and 5.0 g (5 mmol) of Zdol ($HOCH_2CF_2(OCF_2)_n$—$(OC_2F_4)_m$—$OCF_2CH_2OH$) (manufactured by Ausimont Co., Ltd., molecular weight 1,000) were dissolved in 20 ml of hexafluoroxylene, and 50 mg of dibutyltin laurate was then added as a catalyst and the mixture was stirred. A solution of 1.74 g (10 mmol) of toluylene diisocyanate in 5 ml of hexafluoroxylene was then added to the reaction mixture at room temperature. The solution was left to stand overnight, and yielded a polymer solution.

This polymer solution was applied to a glass plate and dried, and produced an elastic film.

Example 6

Polyurethane Polyurea Synthesis 1.042 g (5 mmol) of tetrafluoro-p-xylylenediamine and 5.0 g (5 mmol) of Zdol (as described above) were dissolved in 20 ml of hexafluoroxylene and stirred at room temperature. A solution of 1.74 g (10 mmol) of toluylene diisocyanate in 5 ml of hexafluoroxylene was then added gradually to the reaction solution. The solution was left to stand overnight, and yielded a polymer solution.

Measurements were conducted by using known methods to generate cast films from the above polymer solutions, which were then used as measurement samples. The results are shown in Table 1. Infrared absorption was measured by a transmission method using a FT/IR-8000 manufactured by Jasco Corporation, the contact angle relative to water was measured by a liquid droplet method using a CA-DT type contact angle meter manufactured by Kyowa Interface Science Co., Ltd, optical loss was measured by a cut back method, and thermal analysis was performed under an atmosphere of nitrogen using a SSC5200H manufactured by Seiko Instruments.

Example 7

11.4 g (55.0 mmol) of tetrafluoro-p-xylylenediamine was dissolved in 70.0 ml of N,N-dimethylacetamide. 24.4 g (55.0 mmol) of 4,4'-(hexafluoroisopropylidene)diphthalic anhydride was then added gradually, under an atmosphere of nitrogen and at a temperature of 20° C. The resulting mixture was stirred for 4 hours at room temperature and yielded a N,N-dimethylacetamide solution of a polyamic acid with a viscosity of approximately 12 Pa·s. This solution was spin coated onto a silicon substrate, and subjected to imidization under an atmosphere of nitrogen by heating for 1 hour at 100° C., 1 hour at 200° C., and then 1 hour at 300° C., yielding a polyimide of film thickness 5 to 50 μm. Measurement of the refractive index of this polyimide film at a wavelength of 1.3 μm using a prism coupling method revealed a TE mode refractive index ($n_{TE}$) of 1.523, a TM mode refractive index ($n_{TM}$) of 1.520, and a birefringence (the difference between the TE mode refractive index and the TM mode refractive index, namely $\Delta n$) of 0.003.

Comparative Example 5

6.40 g (20.0 mmol) of 2,2'-bis(trifluoromethyl)-4,4'-diaminobiphenyl was dissolved in 100 ml of N,N-dimethylacetamide. 8.88 g (20.0 mmol) of 4,4'-(hexafluoroisopropylidene)diphthalic anhydride was then added gradually, under an atmosphere of nitrogen and at a temperature of 20 C. The resulting mixture was stirred for 3 days at room temperature and yielded a N,N-dimethylacetamide solution of a polyamic acid with a viscosity of approximately 8 Pa·s. This solution was spin coated onto a silicon substrate, and subjected to imidization under an atmosphere of nitrogen by heating for 1 hour at 100° C., 1 hour at 200° C., and then 1 hour at 350° C., yielding a polyimide of film thickness 2 to 50 μm. Measurement of the infrared absorption spectrum of the polyimide film revealed characteristic imide group absorptions at 1740 and 1790 cm$^{-1}$, confirming that the imidization had proceeded to completion. Measurement of the refractive index of this polyimide film at a wavelength of 1.3 μm using a prism coupling method revealed an $n_{TE}$ value of 1.523, an $n_{TM}$ value of 1.514, and a Δn value of 0.009.

Example 8

8.32 g (40.0 mmol) of tetrafluoro-p-xylylenediamine was dissolved in 70.0 ml of N,N-dimethylacetamide. A premixed combination of 8.88 g (20.0 mmol) of 4,4'-(hexafluoroisopropylidene)diphthalic anhydride and 6.20 g (20.0 mmol) of 4,4'-oxydiphthalic anhydride was then added gradually, under an atmosphere of nitrogen and at a temperature of 20° C. The resulting mixture was stirred for 5 hours at room temperature and yielded a N,N-dimethylacetamide solution of a polyamic acid copolymer with a viscosity of approximately 10 Pa·s. This solution was spin coated onto a silicon substrate, and subjected to imidization under an atmosphere of nitrogen by heating for 1 hour at 100° C., 1 hour at 200° C., and then 1 hour at 300° C., yielding a polyimide copolymer film of film thickness 5 to 50 μm. Measurement of the infrared absorption spectrum of the polyimide film revealed characteristic imide group absorptions at 1740 and 1780 cm$^{-1}$, confirming that the imidization had proceeded to completion. Measurement of the refractive index of this polyimide copolymer film at a wavelength of 1.3 μm using a prism coupling method revealed an $n_{TE}$ value of 1.555, an $n_{TM}$ value of 1.551, and a Δn value of 0.004.

Example 9

8.32 g (40.0 mmol) of tetrafluoro-p-xylylenediamine was dissolved in 70.0 ml of N,N-dimethylacetamide. 12.40 g (40.0 mmol) of 4,4'-oxydiphthalic anhydride was then added gradually, under an atmosphere of nitrogen and at a temperature of 20° C. The resulting mixture was stirred for 5 hours at room temperature and yielded a N,N-dimethylacetamide solution of a polyamic acid with a viscosity of approximately 7 Pa·s. This solution was spin coated onto a silicon substrate, and subjected to imidization under an atmosphere of nitrogen by heating for 1 hour at 100° C., 1 hour at 200° C., and then 1 hour at 300° C., yielding a polyimide of film thickness.5 to 50 μm. Measurement of the infrared absorption spectrum of the film revealed characteristic imide group absorptions at 1740 and 1780 cm$^{-1}$, confirming that the imidization had proceeded to completion. Measurement of the refractive index of this polyimide copolymer film at a wavelength of 1.3 μm using a prism coupling method revealed an $n_{TE}$ value of 1.587, an $n_{TM}$ value of 1.583, and a Δn value of 0.004.

Example 10

4.16 g (20.0 mmol) of tetrafluoro-p-xylylenediamine and 2.72 g (20.0 mmol) of p-xylylenediamine was dissolved in 40.0 ml of N,N-dimethylacetamide. 17.88 g (40.0 mmol) of 4,4'-(hexafluoroisopropylidene)diphthalic anhydride was then added gradually, under an atmosphere of nitrogen and at a temperature of 20° C. The resulting mixture was stirred for 5 hours at room temperature and yielded a N,N-dimethylacetamide solution of a polyamic acid copolymer with a viscosity of approximately 5 Pa·s. This solution was spin coated onto a silicon substrate, and subjected to imidization under an atmosphere of nitrogen by heating for 1 hour at 100° C., 1 hour at 200° C., and then 1 hour at 300° C., yielding a polyimide copolymer film of thickness 5 to 50 μm. Measurement of the infrared absorption spectrum of the film revealed characteristic imide group absorptions at 1740 and 1780 cm$^{-1}$, confirming that the imidization had proceeded to completion. Measurement of the refractive index of this polyimide copolymer film at a wavelength of 1.3 μm using a prism coupling method revealed an $n_{TE}$ value of 1.534, an $n_{TM}$ value of 1.531, and a Δn value of 0.003.

The refractive index values at a wavelength of 1.3 μm for the films obtained in the examples 7 to 10 and the comparative example 5 are shown in Table 2. Refractive index measurements were conducted at 24° C. by a prism coupling method, using a PC-2010 manufactured by Metricon Corporation.

Example 11

1.042 g (5.0 mmol) of tetrafluoro-p-xylylenediamine was dissolved in 15 ml of N,N-dimethylacetamide. 1.385 g (5.0 mmol) of hexafluoroglutaryl chloride was then added and stirred, under an atmosphere of nitrogen and at a temperature of 20° C. Subsequently, 1.06 g (10.5 mmol) of distillation purified triethylamine was added, and the resulting mixture was stirred for 6 hours at room temperature. The triethylamine hydrochloride by-product was filtered off and removed, yielding a N,N-dimethylacetamide solution of a polyamide. 200 ml of methanol was added to the solution, and the precipitated polyamide was then filtered and isolated, and dried under reduced pressure. The weight average molecular weight of the thus obtained polyamide was 110,000 (GPC measurement, RI detector, polystyrene standard), and the melting point was 299° C.

Example 12

1.05 g (5 mmol) of tetrafluoro-p-xylylene glycol was dissolved in 10 ml of 1N NaOH. A solution of tetrafluoroterephthaloyl chloride in 15 ml of dichloromethane was then added at a temperature of 10° C. and stirred for 6 hours to form a suspension. The product polymer was filtered off, washed with water, and then dried under reduced pressure. The weight average molecular weight of the thus obtained polyester was 100,000 (GPC measurement, RI detector, polystyrene standard), and the melting point was 235° C.

TABLE 1

| Example | Infrared absorption C=O cm$^{-1}$ | Water contact angle (degrees) | Optical loss (1.3 μm) dB/cm | Melting point (Tm) or glass transition temperature (Tg) |
| --- | --- | --- | --- | --- |
| Example 1 | 1780 1740 | 85 | 0.7 | Tg 320° C. |
| Comparative Example 1 | 1790 1740 | 84 | 0.6 | Tg 300° C. |

TABLE 1-continued

| Example | Infrared absorption C=O cm$^{-1}$ | Water contact angle (degrees) | Optical loss (1.3 μm) dB/cm | Melting point (Tm) or glass transition temperature (Tg) |
|---|---|---|---|---|
| Example 2 | 1640 | 82 | 1.1 | Tg 310° C. |
| Example 3 | 1760 | 85 | 0.7 | Tg 190° C. |
| Comparative Example 4 | 1750 | 36 | 45 | Tg 180° C. |
| Example 4 | 1780 | 85 | 0.6 | Tg 170° C. |
| Example 5 | 1720 | 105 | 0.5 | Tm 110° C. |
| Example 6 | 1660 | 104 | 0.5 | Tm 150° C. |

TABLE 2

| Example | $n_{TE}$ | $n_{TM}$ | Δn |
|---|---|---|---|
| Example 7 | 1.523 | 1.520 | 0.003 |
| Example 8 | 1.555 | 1.551 | 0.004 |
| Example 9 | 1.587 | 1.583 | 0.004 |
| Example 10 | 1.534 | 1.531 | 0.003 |
| Comparative example 5 | 1.523 | 1.514 | 0.009 |

In comparison with polymers containing no fluorine, polymers comprising a tetrafluoroxylylenediamine or a tetrafluoroxylylene glycol display superior transparency at the long wavelength end of the visible light spectrum and have smaller birefringence values, and by using comonomers with differing fluorine content, the refractive index can be controlled while maintaining a constant birefringence.

INDUSTRIAL APPLICABILITY

By conducting a reaction such as a condensation or an addition reaction using a tetrafluoroxylylenediamine or a tetrafluoroxylylene glycol as a raw material, a fluorinated polymer with superior transparency at the long wavelength end of the visible light spectrum and excellent water repellency can be obtained.

What is claimed is:
1. A fluorinated polymer comprising a structure represented by a formula (1) as a structural unit:

(1)

wherein said structure being at least one of an imide structure, an ester structure, a carbonate structure, a urea structure and a urethane structure.

2. A fluorinated polymer according to claim 1, wherein a repeating unit comprising a structural unit with a structure represented by a formula (1) accounts for at least 10 mol % of all repeating units within said polymer.

(1)

3. A fluorinated polymer according to claim 1, comprising at least one of structures represented by formula (2), formula (3), formula (5), formula (6), formula (7), formula (8) and formula (9) as a structural unit:

(2)

(3)

(5)

(6)

(7)

(8)

-continued (wherein, R represents a hydrogen atom or a low alkyl group of 1 to 4 carbon atoms).

4. A fluorinated polymer according to claim 1, obtained by reacting a compound represented by a formula (10), (wherein X represents an amino group), with a tetracarboxylic acid compound or a derivative thereof, or with a tricarboxylic acid compound or a derivative thereof.

5. A fluorinated polymer according to claim 1, obtained by reacting a compound represented by said formula (10) (wherein X represents an amino group) with a diisocyanate compound or a dicarbamoyl chloride compound.

6. A fluorinated polymer according to claim 1, obtained by reacting a compound represented by said formula (10) (wherein X represents an amino group) with a di(chlorocarbonyloxy) compound.

7. A fluorinated polymer according to claim 1, obtained by reacting a compound represented by said formula (10) (wherein X represents an isocyanate group) with a diamine compound.

8. A fluorinated polymer according to claim 1, obtained by reacting a compound represented by said formula (10) (wherein X represents an isocyanate group) with a diol compound.

9. A fluorinated polymer according to claim 1, obtained by reacting a compound represented by said formula (10) (wherein X represents a hydroxyl group) with a dicarboxylic acid compound or a derivative thereof.

10. A fluorinated polymer according to claim 1, obtained by reacting a compound represented by said formula (10) (wherein X represents a hydroxyl group) with a diisocyanate compound or a dicarbamoyl chloride compound.

11. A fluorinated polymer according to claim 1, obtained by reacting a compound represented by said formula (10) (wherein X represents a hydroxyl group) with a di(chlorocarbonyloxy) compound.

12. A fluorinated polymer according to claim 1, obtained by reacting a compound represented by said formula (10) (wherein X represents a chlorocarbonyloxy group) with a diamine compound.

13. A fluorinated polymer according to claim 1, obtained by reacting a compound represented by said formula (10) (wherein X represents a chlorocarbonyloxy group) with a diol compound.

14. A fluorinated polymer according to claim 1, comprising a structure represented by a formula (11) as a structural unit:

(wherein Q represents a tetravalent organic group).

15. A fluorinated polymer according to claim 1, comprising a structure represented by a formula (12) as a structural unit.

16. A method of producing a fluorinated polymer, wherein a compound represented by said formula (10) (wherein X represents an amino group) and a tetracarboxylic acid compound or a derivative thereof, or a tricarboxylic acid compound or a derivative thereof, are reacted together to produce a fluorinated polymer according to claim 1.

17. A method of producing a fluorinated polymer, wherein a compound represented by said formula (10) (wherein X represents an amino group) and a diisocyanate compound or a dicarbamoyl chloride compound are reacted together to produce a fluorinated polymer according to claim 1.

18. A method of producing a fluorinated polymer, wherein a compound represented by said formula (10) (wherein X represents an amino group) and a di(chloroformate) compound are reacted together to produce a fluorinated polymer according to claim 1.

19. A method of producing a fluorinated polymer, wherein a compound represented by said formula (10) (wherein X represents an isocyanate group) and a diamine compound are reacted together to produce a fluorinated polymer according to claim 1.

20. A method of producing a fluorinated polymer, wherein a compound represented by said formula (10) (wherein X represents an isocyanate group) and a diol compound are reacted together to produce a fluorinated polymer according to claim 1.

21. A method of producing a fluorinated polymer, wherein a compound represented by said formula (10) (wherein X represents a hydroxyl group) and a dicarboxylic acid compound or a derivative thereof are reacted together to produce a fluorinated polymer according to claim 1.

22. A method of producing a fluorinated polymer, wherein a compound represented by said formula (10) (wherein X represents a hydroxyl group) and a diisocyanate compound or a dicarbamoyl chloride compound are reacted together to produce a fluorinated polymer according to claim 1.

23. A method of producing a fluorinated polymer, wherein a compound represented by said formula (10) (wherein X represents a hydroxyl group) and a di(chlorocarbonyloxy)

compound are reacted together to produce a fluorinated polymer according to claim 1.

24. A method of producing a fluorinated polymer, wherein a compound represented by said formula (10) (wherein X represents a chlorocarbonyloxy group) and a diamine compound are reacted together to produce a fluorinated polymer according to claim 1.

25. A method of producing a fluorinated polymer, wherein a compound represented by said formula (10) (wherein X represents a chiorocarbonyloxy group) and a diol compound are reacted together to produce a fluorinated polymer according to claim 1.

* * * * *